United States Patent [19]

Hoppe

[11] Patent Number: 5,219,061
[45] Date of Patent: Jun. 15, 1993

[54] METHOD AND DEVICE FOR FEEDING CANS TO A CONTINUOUS STERILIZER

[75] Inventor: Johannes Hoppe, Monnickendam, Netherlands

[73] Assignee: Stork Amsterdam B.V., Amsterdam, Netherlands

[21] Appl. No.: 915,744

[22] Filed: Jul. 21, 1992

Related U.S. Application Data

[63] Continuation of Ser. No. 605,420, Oct. 30, 1990, abandoned.

[30] Foreign Application Priority Data

Nov. 10, 1989 [NL] Netherlands ............... 8902792

[51] Int. Cl.[5] .................................... B65G 47/26
[52] U.S. Cl. ........................ 198/419.1; 198/463.6; 198/429
[58] Field of Search ............ 198/419.1, 419.2, 419.3, 198/463.6, 429, 430

[56] References Cited

U.S. PATENT DOCUMENTS

| 2,147,055 | 2/1939 | Perkins et al. | |
|---|---|---|---|
| 2,400,484 | 5/1946 | Campana | |
| 3,279,581 | 10/1966 | Drennan | 198/419.1 |
| 3,613,551 | 10/1971 | Reimers | |
| 3,642,111 | 2/1972 | Reimers et al. | 198/429 |
| 3,762,394 | 10/1973 | Newcomer | |
| 3,970,188 | 5/1976 | Smorenburg | |
| 5,035,315 | 7/1991 | Fukusaki et al. | 198/419.2 |

FOREIGN PATENT DOCUMENTS

| 400295 | 12/1990 | European Pat. Off. | 198/419.2 |
|---|---|---|---|
| 1156389 | 4/1958 | France | |
| 1184416 | 7/1959 | France | |
| 1550703 | 12/1968 | France | |
| 2027368 | 9/1970 | France | |
| 2080738 | 11/1971 | France | |
| 2200156 | 4/1974 | France | |
| 6902462 | 8/1970 | Netherlands | |
| 1147750 | 4/1969 | United Kingdom | |
| 2052420 | 1/1981 | United Kingdom | 198/419.1 |

OTHER PUBLICATIONS

Dutch Search Report and Annex in Dutch and English.

Primary Examiner—Joseph E. Valenza
Attorney, Agent, or Firm—Sandler Greenblum & Bernstein

[57] ABSTRACT

In a device for feeding cans to a continuous sterilizer provided with a moving chain with can holders for guiding cans through the sterilizer, the cans are supplied in measured quantities according to the capacity of the sterilizer on a can supply belt. A counting device disposed near the end of the can supply belt counts out a predetermined number of cans from the supplied cans repeatedly at intervals and forms them into a group. The number of cans counted out per unit time is greater than the number of cans supplied per unit time, so that an interval arises between the groups of cans. The groups of cans are placed on an intermediate belt for conveying the groups of cans to an insertion device, which places the groups of cans in the can holders of the sterilizer. The number of cans in each group is such that the can holders are always optimally filled.

6 Claims, 3 Drawing Sheets

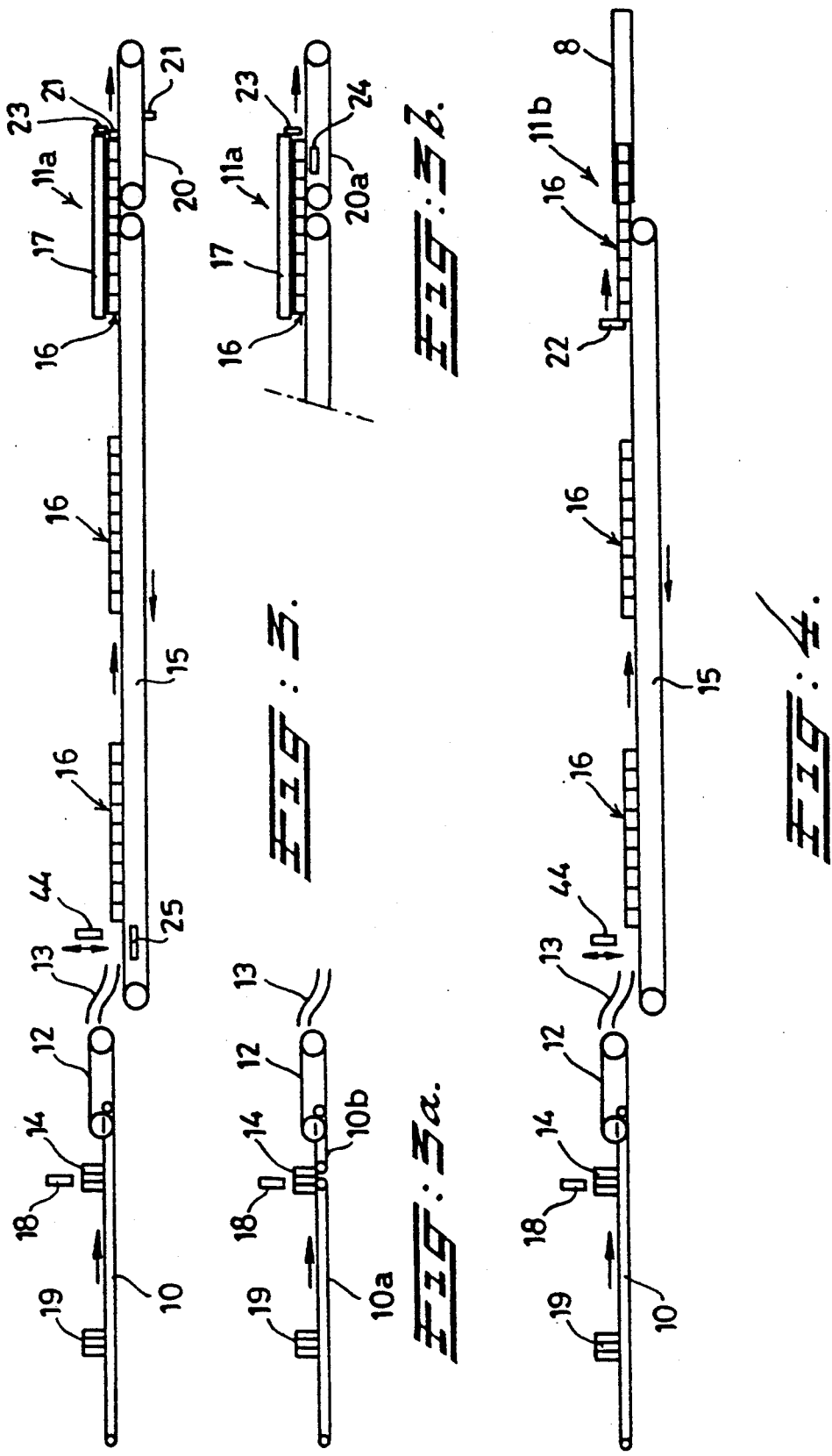

METHOD AND DEVICE FOR FEEDING CANS TO A CONTINUOUS STERILIZER

This application is a continuation of application Ser. No. 07/605,420 filed Oct. 30, 1990, now abandoned.

BACKGROUND OF THE INVENTION

The invention relates to a method and device for feeding cans to a continuous sterilizer provided with a moving chain with can holders for guiding the cans through the sterilizer.

In a continuous sterilizer containers, in particular cans, filled with a product (e.g. a food product) are subjected to a heat treatment (sterilization, pasteurization), the cans being exposed to a certain temperature for a certain period of time. In a continuous sterilizer cans are fed to the sterilizer and removed from the sterilizer continuously. The cans are generally fed in groups to the sterilizer, and are placed in groups in the successive can holders of the sterilizer. Loading of the can holders can take place through a group or row of cans being placed in the lengthwise direction next to a can holder and then being slid into the can holder transversely to the lengthwise direction of the group or row. It is also possible to fill a can holder in the axial direction by sliding a group or row of cans from one end of the can holder in the axial direction into the can holder.

The whole heat treatment process, incl. the supply of the cans to be treated and the discharge of treated cans, is dictated by the speed of the conveyor system of the cans into the sterilizer, since the residence time in the sterilizer is the determining factor for the entire process The cans must not in fact remain in the sterilizer for too short a period, since complete sterilization or pasteurization of the contents thereof then does not take place, or too long either, since this adversely affects the quality of the contents of the cans.

In the case of continuous sterilizers it is important that can holders are filled in the optimum way with cans, in order to achieve maximum utilization of the capacity of the sterilizer. This means that a joined-up group of cans with a predetermined number of cans per group must be present in each can holder. The number of cans per group must not be greater, in order to prevent the length of the group of cans from being greater than the length of the can holder, so that problems occur during filling of the can holders. The number of cans per group must not be smaller either, in order to prevent the can holders from not being completely filled. In addition, it is important for the space between successively infed groups of cans to be sufficient for placing each group of cans in a can holder. Finally, the groups of cans must be supplied in synchronism with the movement for placing the groups of cans in the can holders.

A problem here is that the cans come close together and in an upright position from a filling machine, at a slightly lower speed than the processing speed of the continuous sterilizer. These cans have to be fed at the correct speed and in measured quantities to the continuous sterilizer, taken from the upright position to the horizontal position, and divided into groups with a required minimum space between the groups.

Another problem occurring in practice is the stopping of the cans supplied at high speed, just before or while they are being inserted into the can containers. During braking of the supplied cans against stationary stops the cans are stopped suddenly and the cans bump against each other. Since the cans are not complete energy-absorbing bodies, cans can be flung back. Completely joined-up groups of cans are not then formed, while cans can also end up lying askew, which can lead to serious disruptions.

SUMMARY OF THE INVENTION

The object of the invention is to provide a solution to the above-mentioned problems.

This object is achieved according to the invention by a method for feeding cans to a continuous sterilizer provided with a moving chain with can holders for guiding the cans through the sterilizer, the method comprising the steps of supplying cans in measured quantities according to the capacity of the sterilizer, counting out a predetermined number of cans from the supplied cans repeatedly at intervals and forming them into a group, the number of cans counted out per unit time being greater than the number of cans supplied per unit time, so that an interval arises between the groups of cans, and placing the groups of cans thus formed in succession close together in the successive can holders of the sterilizer.

With the method according to the invention groups of cans can be formed with great reliability with a predetermined number of cans per group, and with the correct interval between successive groups.

In order to be able to feed the groups of cans to the sterilizer at the correct moment, the cans are counted out and formed into groups in phase with the movement of the chain of the can holders.

The object of the invention is also achieved by a device for feeding cans to a continuous sterilizer provided with a moving chain with can holders for guiding the cans through the sterilizer, comprising a supply belt for the cans and an insertion device for placing the cans in groups in the can holders, and further comprising a counting device disposed near the end of the supply belt for counting out repeatedly at intervals and forming into a group a predetermined number of cans, an intermediate belt disposed between the counting device and the insertion device for conveying the groups of cans from the counting device to the insertion device, the insertion device comprising means for joining up the groups of cans to be placed in the can holders.

The invention will now be explained in greater detail with reference to the description of an example of an embodiment shown in the drawings.

BRIEF DESCRIPTION OF THE DRAWINGS

FIG. 3 shows schematically a device according to the invention when the can holders are filled in the transverse direction.

FIG. 3a shows a slightly modified embodiment of the system for counting out cans.

FIG. 3b shows a slightly modified embodiment of the means for joining up cans.

FIG. 4 shows schematically a device according to the invention when the can holders are filled in the axial direction.

FIG. 5 shows schematically a mechanism for driving a carrier element in the device of FIG. 4.

DETAILED DESCRIPTION OF THE PREFERRED EMBODIMENTS

Figure 1:
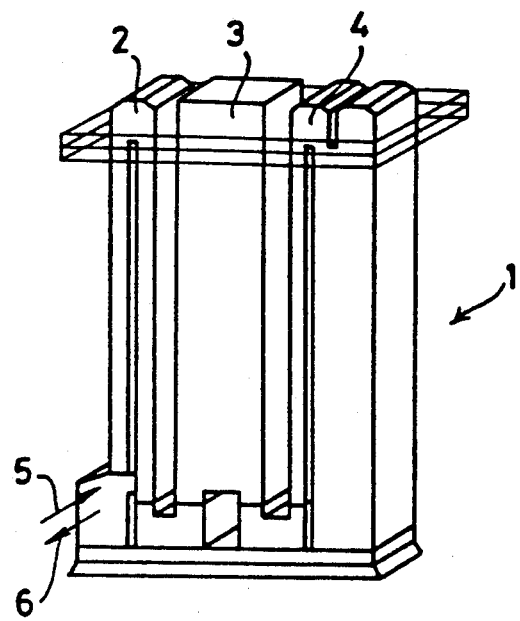
FIG. 1 shows in perspective and very schematically a continuous sterilizer.

FIG. 1 shows in perspective a continuous sterilizer 1 for sterilizing cans filled with a product (for example a food product). The sterilizer comprises a number of towers 2, 3, 4 through which the cans are conveyed in the vertical direction. The cans are conveyed through the sterilizer 1 in can holders which are mounted between two endless conveyor chains. The cans to be sterilized are fed in by means of a can feed device 5, and the sterilized cans are discharged by means of a can discharge device 6.

A continuous sterilizer of the type shown in FIG. 1 is generally known.

Figure 2:
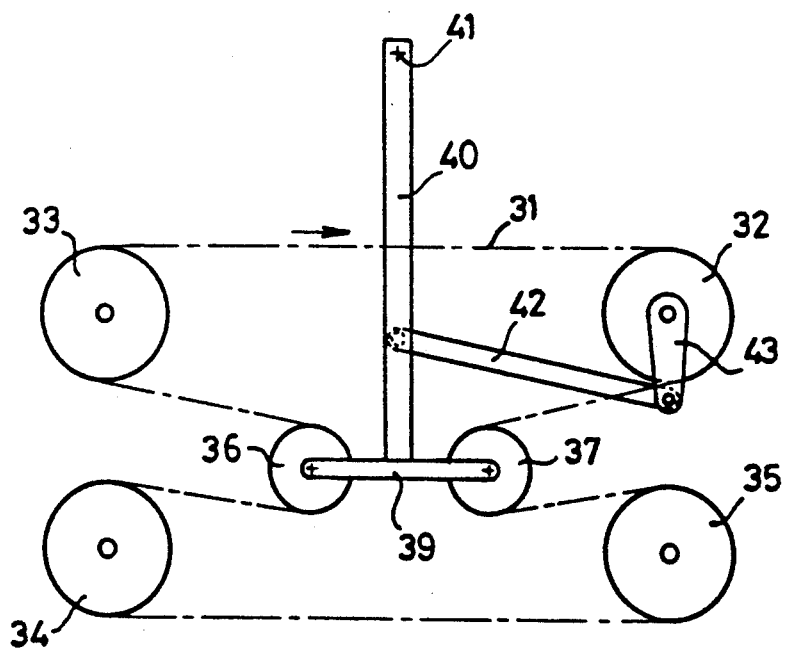
FIG. 2 shows in perspective the bottom part of a continuous sterilizer with a known device for feeding in and discharging cans.
Figure 2:
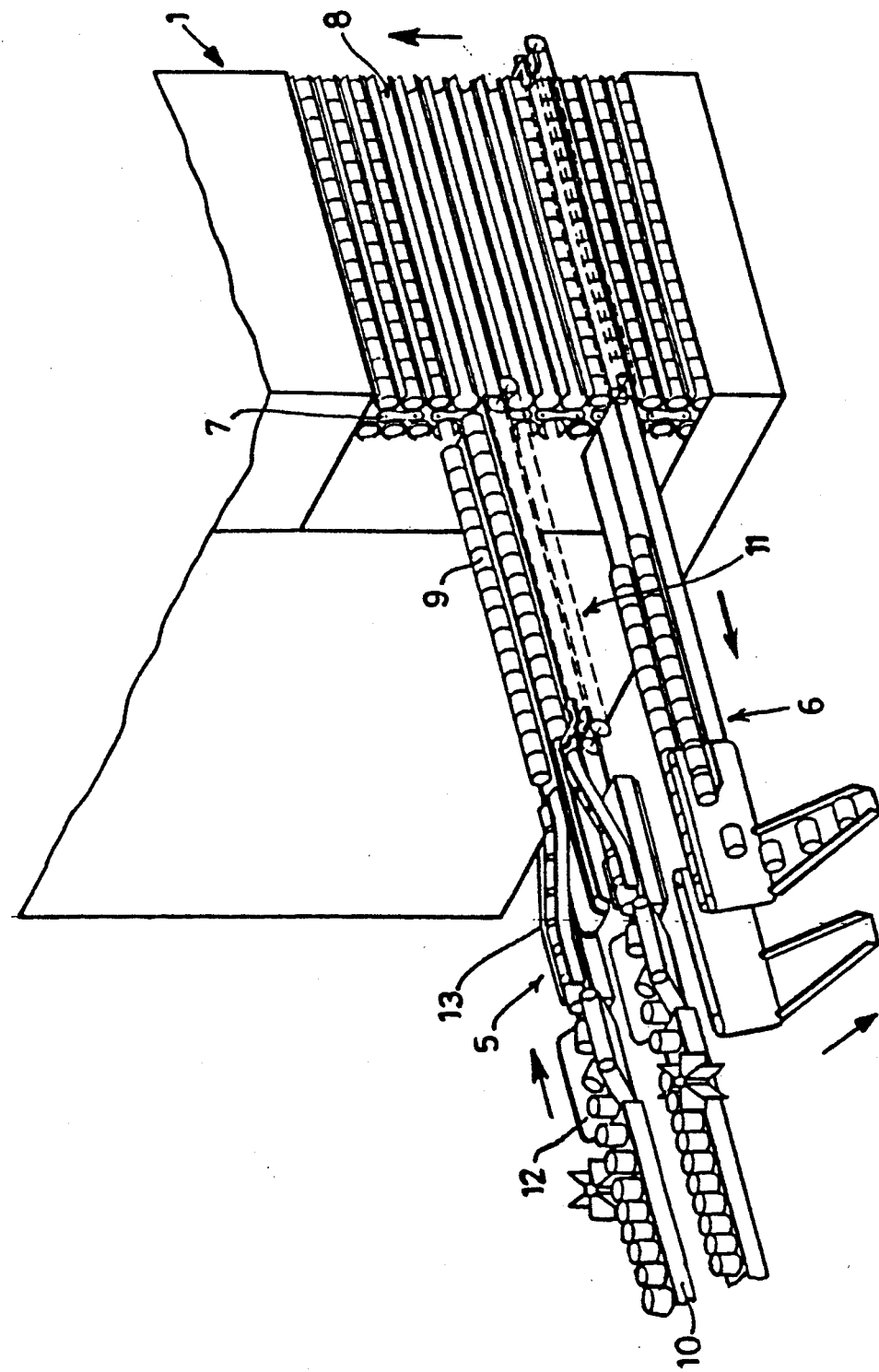

FIG. 2 shows the bottom part of a continuous sterilizer 1 with a known can feed device 5 and can discharge device 6. FIG. 2 also shows a part of one of the two endless conveyor chains 7 on which the can holders 8 are mounted on either side. The conveyor system shown here is a so-called double system. The cans 9 are in this case pushed in the axial direction into the can holders 8.

It is also possible to fix the can holders on one side to the conveyor chains. This is then described as a single system. The cans are then taken next to the can holders for filling of the can holders, and pushed into the can holders in the transverse direction.

The present invention relates to a can feed device 5 (see FIG. 2), which in general comprises a supply belt 10 for cans and an insertion device 11 for placing the cans 9 in groups in the can holders 8. Tilting means, such as a tilting belt 12, are also generally present to take the cans from the upright position on the supply belt 10 to the horizontal position, in order to be able to slide the cans in the horizontal position into the can holders 8. A chute 13 is also disposed downstream of the tilting belt 12.

FIG. 3 shows a first embodiment of the can feed device according to the invention. This can feed device comprises a counting device 14, 18, disposed near the end of the supply belt 10, for counting out repeatedly at intervals and forming into groups a predetermined number of cans, and an intermediate belt 15 disposed between the counting device 14, 18 and the insertion device 11a for conveying the groups of cans 16 from the counting device 14, 18 to the insertion device 11a. In addition, the can feed device, like the known device of FIG. 2, comprises a tilting belt 12 and a chute 13. The can feed device according to the invention also comprises means for joining up the groups of cans 16 to be placed in the can holders 8.

It is pointed out that the insertion device 11a shown in FIG. 3 is designed for sliding the groups of cans in the transverse direction into the can holders. The insertion device 11a here comprises a so-called swivel beam 17 which slides a group of cans 16 into the can holder 8 transversely to the lengthwise direction of the group of cans.

The counting device in the embodiment of the device according to the invention described here comprises a turnstile 14, which is disposed near the end of the supply belt 10. This turnstile 14 serves to retain repeatedly at intervals the cans supplied by the supply belt 10 and subsequently to count out a predetermined number thereof, and is coupled by means of an overrunning clutch to the drive mechanism of the sterilizer 1, thereby limiting the speed of rotation of the turnstile 14.

The cans on the supply belt 10 make the turnstile 14 turn. The speed of the supply belt 10 is such that on the part of the supply belt 10 between the turnstile 14 and the tilting belt 12 the cans counted out by the turnstile 14 are at distance from one another, so that on the tilting belt 12 each can will be tilted without touching other cans on the tilting belt. The turnstile 14 is blocked by a brake (not shown) and retains the supplied cans until a signal is received from the drive mechanism of the sterilizer 1 to release the turnstile. In the case of a normal supply of cans, each turnstile position will contain one can. The number of cans which have passed through can be counted by counting the number of passages of a bar of the turnstile by means of a sensor 18. When the desired number of cans has passed, the turnstile is stopped again. In this way, groups of cans which have the desired number of cans can always be counted out.

FIG. 3 also shows a second turnstile 19 disposed next to the supply belt 10. This turnstile 19 ensures a supply of cans in measured quantities. The turnstile 19 is also coupled by means of an overrunning clutch to the drive mechanism of the sterilizer, as a result of which the speed of rotation of the turnstile 19 is also limited. The turnstile 19 in this way allows cans through in measured quantities according to the capacity of the sterilizer.

The speed of rotation of the turnstile 14 is greater that the speed of rotation of the turnstile 19, so that, despite the fact that the turnstile 14 stops briefly at intervals, no blockages of cans occur on the supply belt 10. For example, if n is the number of cans processed by the sterilizer per unit time, the number of cans allowed through by the turnstile 19 per unit time is also n, and the number of cans allowed through by the turnstile 14 during rotation is 1.5 n In this case, the speed of the supply belt will be approximately 2 n d, d being the diameter of the cans.

FIG. 3a shows a slightly modified embodiment of the system for counting out cans. In this embodiment the overrunning clutch between the turnstile 14 and the drive mechanism of the sterilizer is left out. The turnstile 14 is then freely rotatable. Like in the embodiment of FIG. 3, the turnstile 14 is rotated by the cans on the supply belt, but the speed of rotation of the turnstile 14 is not limited. In order to ensure that in the part of the supply belt between the turnstile 14 and the tilting belt 12 the cans counted out by the turnstile are at distance from one another, in the embodiment of FIG. 3a the supply belt is divided into two parts 10a and 10b. The part 10b of the supply belt between the turnstile 14 and the tilting belt 12 runs with a higher speed than the part 10a of the supply belt upstream of the turnstile 14. For example, the part 10b runs with the same speed (of approximately 2 n d), as the supply belt 10 of FIG. 3, whereas the part 10a runs with a speed of 1.5 n d. The parts 10a and 10b of the supply belt are both coupled to the drive mechanism of the sterilizer, each via its own adjustable transmission.

Like in the embodiment of FIG. 3, the turnstile 19 can be coupled by means of an overrunning clutch to the drive mechanism of the sterilizer. However, in both embodiments it is also possible to provide the turnstile 19 with its own drive, which in that case must be synchronized with the drive mechanism of the sterilizer.

The insertion device for placing the groups of cans in the can holders can be designed in different ways, depending on the way in which the cans are placed in the can holders. The groups of cans 16 can, in fact, as already mentioned, be placed in the can holders in a direction at right angles to the lengthwise direction of the can groups 16 and the can holders 8 (as in FIG. 3) or in the axial direction of the can groups 16 and the can holders 8 (as in FIGS. 2 and 4).

In the first case (FIG. 3) the cans are first brought to a standstill and thereafter slid, at right angles to the earlier direction of conveyance, into the can holders 8 by the swivel beam 17. It is important here that the cans should lie against one another, so that optimum use can be made of the capacity of the can holders. Since the cans which are counted out by the turnstile 14 do not lie against one another, an end belt 20 is disposed downstream of the intermediate belt 15. The end belt 20 is designed to move at a lower speed than the intermediate belt 15. The speed of the end belt 20 is for example half that of the intermediate belt 15. The end belt 20 is provided with at least one retaining element 21 for retaining the cans placed on the end belt 20 by the intermediate belt 15. In the embodiment shown in FIG. 3 the end belt 20 has two such retaining elements 21 lying at a distance from each other which is equal to half the belt length. The movements of the intermediate belt 15, the end belt 20 and the turnstile 14 are interconnected in such a way that a retaining element 21 "comes up" when a first can from a group of cans 16 lying on the intermediate belt 15 is placed on the end belt 20. Since the end belt 20 is running at a lower speed than the intermediate belt 15, the group of cans 16 placed on the end belt 20 by the intermediate belt 15 will be retained by the retaining element 21, and the cans of the group concerned will be pushed against one another. In this way a joined-up group of cans 16 is formed, the speed of which is reduced in steps, not of the group as a whole but per can of the group. This prevents great collisions.

When the retaining element 21 is in the position shown in FIG. 3, a joined-up group of cans is formed with the correct number of cans per group. A fixed end stop 23 ensures that in this situation the group of cans is in the proper position with respect to a can holder (not shown here). The group of cans can then be pushed into a can holder at right angles to the direction of movement by the swivel beam 17. As already mentioned above, the movements of the intermediate belt 15, the end belt 20 and the turnstile 14 are interconnected. These movements are in turn coupled to the movement of the chain with can holders 8 of the sterilizer 1, in such a way that the moment a joined-up group of cans 16 is formed a can holder is next to the intermediate belt 15 and the end belt 20, and is ready to take a groups of cans.

FIG. 3b shows a slightly modified embodiment of the means for joining up the cans. This embodiment has an end belt 20a without a retaining element. The cans are retained on the end belt 20a by the friction force between the cans and the end belt. To increase this friction force a magnet 24 can be placed under the upper part of the end belt 20a. By means of this retaining magnet the force exerted by the cans on the end belt 20a is increased. The fixed end stop 23 ensures that a joined-up group of cans 16 will be positioned properly with respect to a can holder.

It is noted that also under the upper part of the intermediate belt 15, in the region where cans coming from the chute fall on the intermediate belt 15, a magnet 25 can be provided for increasing the friction force between the cans and the belt. In this way the cans coming from the chute 13 will have the speed of the intermediate belt 15 in very short time.

If the groups of cans are pushed in the axial direction into the can holders, the insertion device is different. As shown schematically in FIG. 4, the insertion device 11b then comprise a carrier element 22 which is movable along the intermediate belt 15. In this case also, the movements of the intermediate belt 15, the turnstile 14 and the carrier element 22 are interconnected and are connected to the movement of the chain with can holders 8 of the sterilizer 1, in such a way that when a group of cans 16 is formed on the intermediate belt 15, a can holder 8 is lying directly in line with this group of cans 16. The carrier element 22 can then slide the group of cans 16 from the intermediate belt 15 into the can holder 8. The speed at which the carrier element 22 moves is not constant during the movement. The speed of the carrier element 22 is at first lower than the speed of the intermediate belt 15, and then equal to it, higher, equal to, and again lower than the speed of the intermediate belt 15. The cans on the intermediate belt 15 are consequently pushed at first gradually against each other on the belt to form a joined-up group, and while the cans are being slid into the can holder 8 they are braked by the can holder 8 through the fact that the cans are subjected to friction from the wall of the can holder 8. In this way, the cans are in the end placed at a relatively low end speed in the can holder 8, thus minimizing collisions.

The variable speed of the carrier element 22 can be achieved with the drive system shown schematically in FIG. 5. This system comprises a chain 31 which is guided over a number of rollers 32 to 37. The rollers 32 to 35 have a fixed shaft, while the shafts of the rollers 36 and 37 are fixed on a frame 39 which can move to and fro. The roller 32 drives the chain 31, the drive of the roller 32 being coupled to the drive of the sterilizer. The carrier element 22 is driven by means of the roller 34, whose speed of rotation can be varied by the to and fro movement of the frame 39 with the rollers 36 and 37. The to and fro movement of the frame 39 is obtained by a swinging movement of a rod 40 fixed to the frame 39 about a point of rotation 41, and is coupled to the drive of the roller 32 by means of a crank 42 and a rod 43. The movement of the frame 39 with rollers 36 and 37 takes place in phase with the movement of the can holders in the sterilizer.

The device according to the invention is preferably also provided with a system which in the event of a stoppage through e.g. a fault again synchronizes the movement of the groups of cans with the movement of the can holders into the sterilizer.

If a fault occurs in the plant and the plant is brought to a standstill, the intermediate belt 15 is also brought to a standstill. If at that moment the first can of a group has already arrived on the intermediate belt 15, then the group of cans concerned is still in phase with the can holders, and when the plant is started up again no problem will arise with the phasing. However, if at the moment of stopping a certain number of cans of a group has already passed the counting turnstile 14, but has not yet reached the intermediate belt 15, e.g. through the fact that they are still on the tilting belt 12 or in the chute 13, these cans will reach the intermediate belt 15 out of phase.

When the plant is started up again after a stoppage, it is therefore ensured that such a group of cans is brought into phase again by retaining this group with a pneumatically operated stop 44 moving in the path of the cans (see FIGS. 3 and 4) and releasing this group in phase again after restarting of the plant. The time of release is related to the movement of the insertion device.

With the aid of the device according to the invention, during operation of the plant a predetermined number of cans from the supplied cans is counted out repeatedly and formed into a group. The groups of cans thus formed are placed in the successive can holders of the sterilizer after being joined up. The cans are counted out and formed into groups in phase with the movement of the chain with the can holders and the insertion device. Just before they are placed in the can holders, the speed of movement of the cans is reduced.

In this way it is ensured that the sterilizer has an optimum degree of filling, through a maximum number of cans lying against each other always being placed in each can holder. Besides, due to the fact that the speed of the cans is reduced, the chance of faults occurring in the plant is reduced considerably.

A method and device for feeding in cans to a sterilizer is described above. It will be clear that the invention need not be restricted thereto. Other similar objects such as (glass) jars with lids can be fed in a similar manner to a continuous sterilizer.

What is claimed is:

1. An apparatus for feeding cans to a continuous sterilizer, which sterilizer includes a moving chain and can holders for guiding cans through the sterilizer, comprising:

a supply belt for cans;

means for counting positioned near an end of said supply belt for repeatedly counting out, at intervals, a predetermined number of cans to provide an interval being each group of cans to form groups of a predetermined number of cans, wherein said means for counting comprise a mechanism to count the predetermined number of cans more rapidly than cans being supplied to provide the interval between each group of cans, said mechanism comprises a first turnstile positioned near an end of said supply belt for repeatedly retaining, at intervals, cans supplied by said supply belt, and for subsequently counting out a predetermined number of cans; said first turnstile having a speed or rotation during counting related to capacity of the sterilizer; and a sensor to determine the number of cans being passed through the turnstile;

an insertion device for placing cans in groups in the can holders;

an intermediate belt positioned between said counting device and said insertion device for conveying groups of cans from said counting device to said insertion device;

said insertion device including means for joining up cans within a group of cans to be placed in the can holders; and a second turnstile positioned upstream of said first turnstile for allowing cans through continuously and in measured quantities according to the capacity of the sterilizer.

2. An apparatus for feeding cans to a continuous sterilizer, which sterilizer includes a moving chain and can holders for guiding cans through the sterilizer, comprising:

a supply belt for cans;

means for counting positioned near an end of said supply belt for repeatedly counting out, at intervals, a predetermined number of cans to provide an interval being each group of cans to form groups of a predetermined number of cans, wherein said means for counting comprise a mechanism to count the predetermined number of cans more rapidly than cans being supplied to provide the interval between each group of cans;

an insertion device for placing cans in groups in the can holders;

an intermediate belt positioned between said counting device and said insertion device for conveying groups of cans from said counting device to said insertion device;

said insertion device including means for joining up cans within a group of cans to be placed in the can holders; and said insertion device and said means for joining up comprise an end belt constructed and arranged to move at a slower speed than said intermediate belt and means for retaining cans of said end belt that are placed therein by said intermediate belt.

3. The apparatus according to claim 2, wherein said means for retaining cans comprise a retaining element.

4. The apparatus according to claim 2, wherein said means for retaining cans comprise a magnet positioned under an upper part of said end belt.

5. An apparatus for feeding cans to a continuous sterilizer, which sterilizer includes a moving chain and can holders for guiding cans through the sterilizer, comprising:

a supply belt for cans;

means for counting positioned near an end of said supply belt for repeatedly counting out, at intervals, a predetermined number of cans to provide an interval being each group of cans to form groups of a predetermined number of cans, wherein said means for counting comprise a mechanism to count the predetermined number of cans more rapidly than cans being supplied to provide the interval between each group of cans, said mechanism comprises a first turnstile positioned near an end of said supply belt for repeatedly retaining, at intervals, cans supplied by said supply belt, and for subsequently counting out a predetermined number of cans; said first turnstile having a speed of rotation during counting related to capacity of the sterilizer; and a sensor to determine the number of cans being passed through the turnstile;

an insertion device for placing cans in groups in the can holders;

an intermediate belt positioned between said counting device and said insertion device for conveying groups of cans from said counting device to said insertion device; and a second turnstile is positioned upstream of said first turnstile for allowing cans through continuously and in measured quantities according to the capacity of the sterilizer.

6. An apparatus for feeding cans to a continuous sterilizer, which sterilizer includes a moving chain and can holders for guiding cans through the sterilizer, comprising:

a supply belt for cans;

means for counting positioned near an end of said supply belt for repeatedly counting out, at intervals, a predetermined number of cans to provide an interval being each group of cans to form groups of a predetermined number of cans, wherein said means for counting comprise a mechanism to count the predetermined number of cans more rapidly than cans being supplied to provide the interval between each group of cans, said mechanism comprises a first turnstile positioned near an end of said supply belt for repeatedly retaining, at intervals, cans supplied by said supply belt, and for subsequently counting out a predetermined number of cans; said first turnstile having a speed of rotation during counting related to capacity of the sterilizer; and a sensor to determine the number of cans being passed through the turnstile;

an insertion device for placing cans in groups in the can holders;

an intermediate belt positioned between said counting device and said insertion device for conveying groups of cans from said counting device to said insertion device; and said insertion device comprises an end belt constructed and arranged to move at a slower speed than said intermediate belt and means for retaining cans of said end belt that are placed therein by said intermediate belt.

* * * * *